United States Patent
Park et al.

(10) Patent No.: US 10,003,427 B1
(45) Date of Patent: Jun. 19, 2018

(54) BIDIRECTIONAL OPTICAL ELEMENT

(71) Applicant: ELECTRONICS AND TELECOMMUNICATIONS RESEARCH INSTITUTE, Daejeon (KR)

(72) Inventors: Heuk Park, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days. days.

(21) Appl. No.: 15/640,696

(22) Filed: Jul. 3, 2017

(30) Foreign Application Priority Data

Mar. 6, 2017 (KR) .................. 10-2017-0028504

(51) Int. Cl.
  *H04J 14/02* (2006.01)
  *H04B 10/275* (2013.01)
  *G02B 6/293* (2006.01)

(52) U.S. Cl.
  CPC ...... *H04J 14/0216* (2013.01); *G02B 6/29338* (2013.01); *G02B 6/29383* (2013.01); *H04B 10/275* (2013.01); *H04J 14/0204* (2013.01)

(58) Field of Classification Search
  CPC .............. H04J 14/0216; H04J 14/0204; H04J 14/0213; H04J 14/021; H04J 14/0206;
  (Continued)

(56) References Cited

U.S. PATENT DOCUMENTS 7,623,789 B2 * 11/2009 Oberg ................ H04J 14/0208
  398/59
8,032,027 B2 * 10/2011 Popovic ............. G02B 6/12007
  398/82

(Continued)

FOREIGN PATENT DOCUMENTS

JP  2000-298215 A  10/2000

OTHER PUBLICATIONS

Jie Hyun Lee et al., "Experimental demonstration of wavelength domain rogue-free ONU based on wavelength pairing for TDM/WDM optical access networks", Nov. 30, 2015, vol. 23, No. 24., Optical Express.

Primary Examiner — M. R. Sedighian
(74) Attorney, Agent, or Firm — LRK Patent Law Firm

(57) ABSTRACT

A bidirectional optical element in optical network units (ONUs) of a passive optical network (PON) includes a main filter configured to pass an upstream signal having an upstream-channel wavelength and a downstream signal having a downstream-channel wavelength, a drop filter configured to pass the downstream signal having the downstream-channel wavelength and reject the upstream signal having the upstream-channel wavelength, and an add filter configured to pass the upstream signal having the upstream-channel wavelength and reject the downstream signal having the downstream-channel wavelength, wherein the main filter, the drop filter, and the add filter are configured to share a single optical waveguide, and the optical waveguide is configured to connect input ports of the main filter and the drop filter and an output port of the drop filter and is provided in a straight line shape.

14 Claims, 7 Drawing Sheets

(58) Field of Classification Search
CPC ............. H04J 14/0212; G02B 6/29338; G02B 6/29383; H04B 10/275
USPC .............................................. 398/67, 83, 85
See application file for complete search history.

(56) References Cited

U.S. PATENT DOCUMENTS

| | | | |
|---|---|---|---|
| 8,483,564 B2 * | 7/2013 | Mu | ..................... H04J 14/0257 |
| | | | 398/46 |
| 8,705,969 B2 * | 4/2014 | Kim | ................. H04B 10/25754 |
| | | | 398/67 |
| 8,923,700 B2 * | 12/2014 | Socci | ................. G02B 6/12007 |
| | | | 398/85 |
| 9,397,778 B2 | 7/2016 | Lee et al. | |
| 2016/0226618 A1 | 8/2016 | Lee et al. | |
| 2016/0291268 A1 | 10/2016 | Shimura | |
| 2017/0187483 A1 * | 6/2017 | Mansouri Rad | .... H04J 14/0204 |

\* cited by examiner

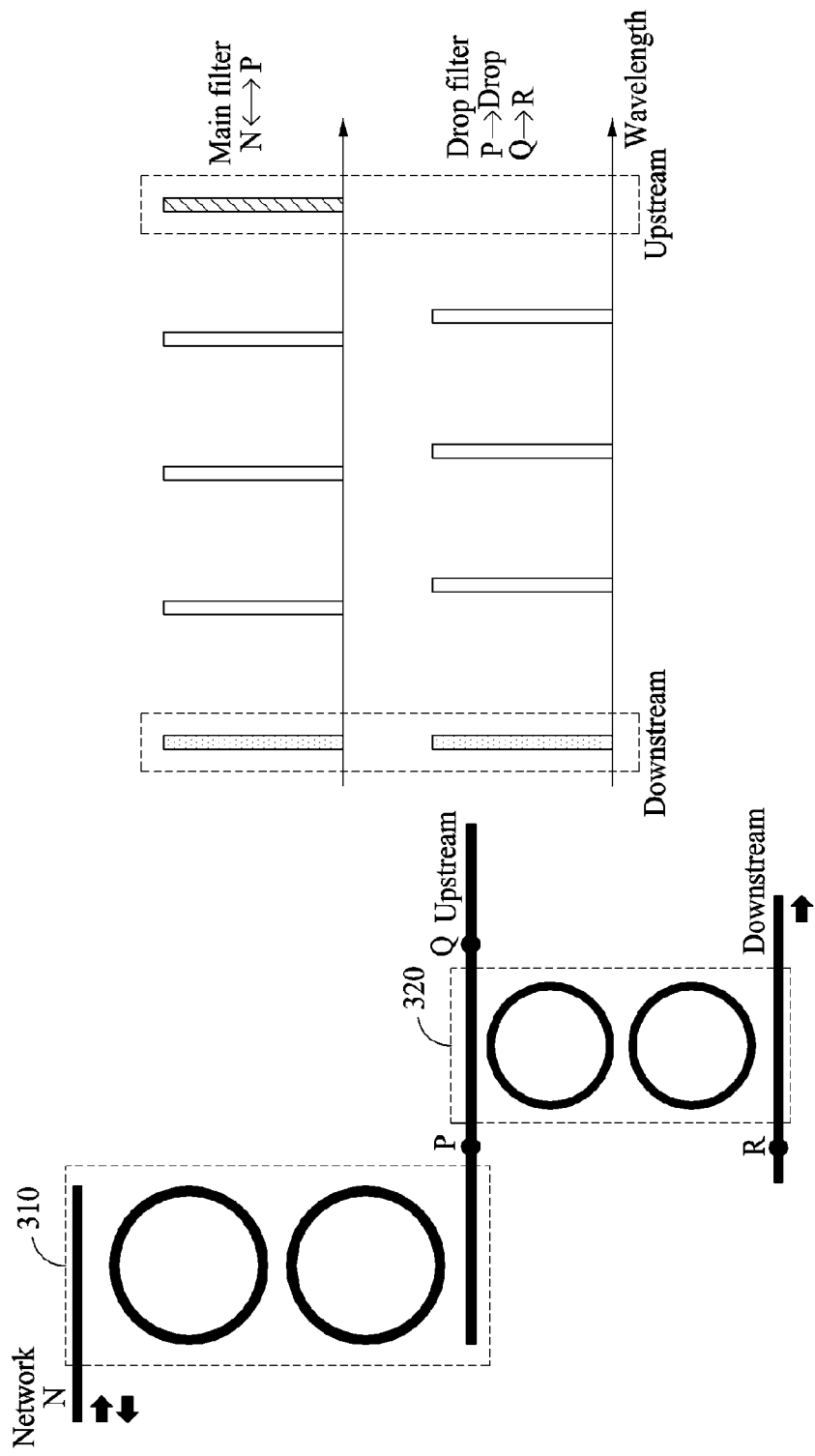

BIDIRECTIONAL OPTICAL ELEMENT

CROSS-REFERENCE TO RELATED APPLICATION(S)

This application claims the priority benefit of Korean Patent Application No. 10-2017-0028504, filed on Mar. 6, 2017, in the Korean Intellectual Property Office, the disclosure of which is incorporated herein by reference for all purposes.

BACKGROUND

1. Field

One or more example embodiments relate to an apparatus for preventing a collision between upstream signals transmitted from different optical network units (ONUs) in a bidirectional optical element included in ONUs of a passive optical network (PON).

2. Description of Related Art

In a passive optical network (PON) system, an upstream signal and a downstream signal may coexist in a single optical fiber. In general, the PON system may use different wavelength of light for each signal to minimize an interference between the upstream signal and the downstream signal. To this end, an optical network unit (ONU) may require a bidirectional optical element or module to divide the downstream signal output from the optical fiber of the PON system while inputting the upstream signal to the optical fiber simultaneously.

Recently, as a scheme of applying wavelength division multiplexing (WDM) technology to the PON system is becoming visible, interests in technology for preventing a collision between upstream signals transmitted from difference ONUs are also increasing. The present disclosure provides a bidirectional optical element used in an ONU to prevent a collision between upstream signals transmitted from a plurality of ONUs.

SUMMARY

An aspect provides a method of configuring a bidirectional optical element with a ring filter including a ring resonator, thereby preventing a collision between upstream signals transmitted from a plurality of ONUs According to an aspect, there is provided a bidirectional optical element in optical network units (ONUs) of a passive optical network (PON), the bidirectional optical element including a main filter configured to pass an upstream signal having an upstream-channel wavelength and a downstream signal having a downstream-channel wavelength, a drop filter configured to pass the downstream signal having the downstream-channel wavelength and reject the upstream signal having the upstream-channel wavelength, and an add filter configured to pass the upstream signal having the upstream-channel wavelength and reject the downstream signal having the downstream-channel wavelength, wherein the main filter, the drop filter, and the add filter are configured to share a single optical waveguide, and the optical waveguide is configured to connect input ports of the main filter and the drop filter and an output port of the drop filter and is provided in a straight line shape.

The main filter, the drop filter, and the add filter may each include at least one ring resonator arranged on a same plane.

The main filter, the drop filter, and the add filter may each include an even number of ring resonators.

When an optical signal input to the main filter is the downstream signal having the downstream-channel wavelength, the optical signal may pass through the main filter and the drop filter.

When an optical signal input to the add filter is the upstream filter having the upstream-channel wavelength, the optical signal may pass through the add filter and the main filter.

The main filter and the drop filter may have different free spectral ranges (FSRs) and pass downstream signals having the same downstream-channel wavelength.

The main filter and the add filter may have different FSRs and pass upstream signals having the same upstream-channel wavelength.

According to another aspect, there is also provided a bidirectional optical element in ONUs of a PON, the bidirectional optical element including a main filter configured to pass an upstream signal having an upstream-channel wavelength and a downstream signal having a downstream-channel wavelength, a drop filter configured to pass the downstream signal having the downstream-channel wavelength and reject the upstream signal having the upstream-channel wavelength, and an add filter configured to pass the upstream signal having the upstream-channel wavelength and reject the downstream signal having the downstream-channel wavelength, wherein the main filter, the drop filter, and the add filter are configured to share a single optical waveguide, and the optical waveguide is configured to connect input ports of the main filter and the drop filter and an output port of the drop filter and is provided in a curved line shape.

The main filter, the drop filter, and the add filter may each include at least one ring resonator arranged on a same plane.

The main filter, the drop filter, and the add filter may each include an odd number of ring resonators.

When an optical signal input to the main filter is the downstream signal having the downstream-channel wavelength, the optical signal may pass through the main filter and the drop filter.

When an optical signal input to the add filter is the upstream signal having the upstream-channel wavelength, the optical signal may pass through the add filter and the main filter.

The main filter and the drop filter may have different FSRs and pass downstream signals having the same downstream-channel wavelength.

The main filter and the add filter may have different FSRs and pass upstream signals having the same upstream-channel wavelength.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 6A and 6B are diagrams illustrating another example of a first bidirectional optical element configured with a second ring filter according to an example embodiment.

DETAILED DESCRIPTION

Hereinafter, some example embodiments will be described in detail with reference to the accompanying drawings.

Figure 1:
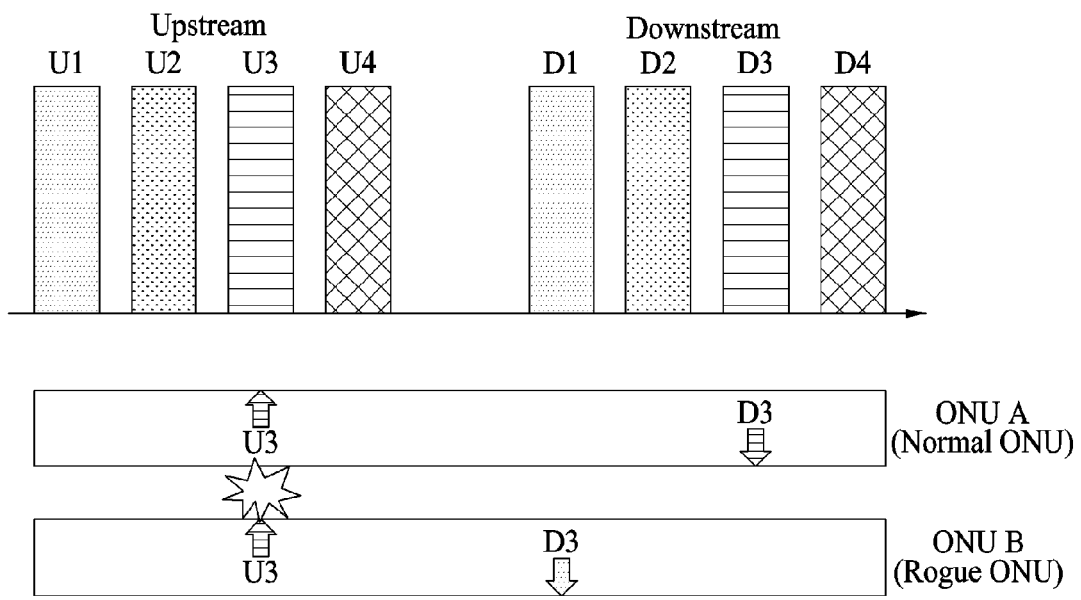
FIG. 1 is a diagram illustrating an example of a rogue optical network unit (ONU) in a wavelength division multiplexing (WDM) scheme according to an example embodiment.

FIG. 1 is a diagram illustrating an example of a rogue optical network unit (ONU) in a wavelength division multiplexing (WDM) scheme according to an example embodiment.

With increasing desires for a wider bandwidth of an optical network, it is becoming more visible to apply WDM technology to increase a capacity of a passive optical network (PON). A rogue ONU may be a problem which may occur when applying the WDM technology to a subscriber line on the optical network. Here, the rogue ONU may indicate an ONU that uses resources allocated to another ONU without permission.

For example, in a time division multiplexing PON (TDM-PON), a rogue ONU may indicate an ONU that transmits data in a time interval allocated to another user. Also, in a WDM-PON, a rogue ONU may indicate an ONU that transmits data at a wavelength allocated to another ONU.

FIG. 1 illustrates a concept of the rogue ONU. In the PON system, four upstream channels and four upstream channels may be provided, and each of the channels may correspond to a different wavelength. For example, a downstream channel D3 and an upstream channel U3 may be allocated to an the ONU A, and a downstream channel D1 and an upstream channel U1 may be allocated to an the ONU B.

As illustrated in FIG. 1, the ONU A may receive an optical signal through the downstream channel D3 and transmit the optical signal through the upstream channel U3. The ONU B may receive an optical signal through the downstream channel D1 and transmit the optical signal through the upstream channel U3 instead of the upstream channel U1.

When the ONU A and the ONU B simultaneously transmit the optical signals through the upstream channel U3, a collision between the upstream signal may occur. In this example, the ONU B may be the rogue ONU that interferes with communication by transmitting the optical signal using a channel not allocated to the ONU B.

There has been proposed a method of constantly maintaining a wavelength interval between an upstream signal and a downstream signal using an operational characteristic of an arrayed waveguide grating router (AWGR) to avoid the rogue ONU in the WDM-based PON system.

A relatively large free spectral range (FSR) may need to be secured to apply the AWG. Due to this, it is difficult to reduce a size of element, and problems may arise in terms of performance.

To solve this, a ring resonator-based bidirectional optical element is proposed in the present disclosure. A size of the ring resonator may be smaller than that of the AWG. Using the ring resonator, it is possible to form an element having less crosstalk. Also, when using the ring resonator, it is easier to provide a smooth passband form. As such, when the ring resonator-based filter is used as the bidirectional optical element, an additional configuration may be required to prevent an operation of the rogue ONU.

Figure 2A:
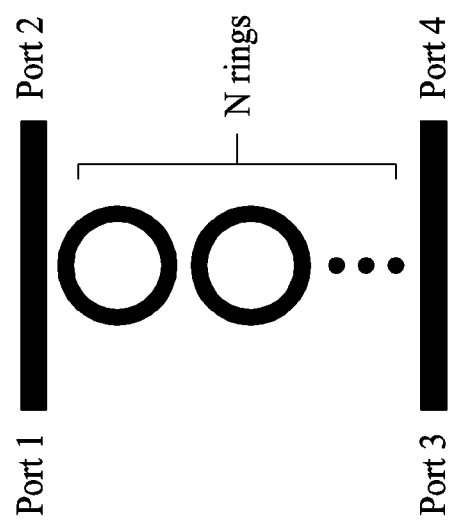
FIGS. 2A and 2B are diagrams illustrating an example of a ring filter configured with a ring resonator and a spectrum of the ring filter according to an example embodiment.
Figure 2B:
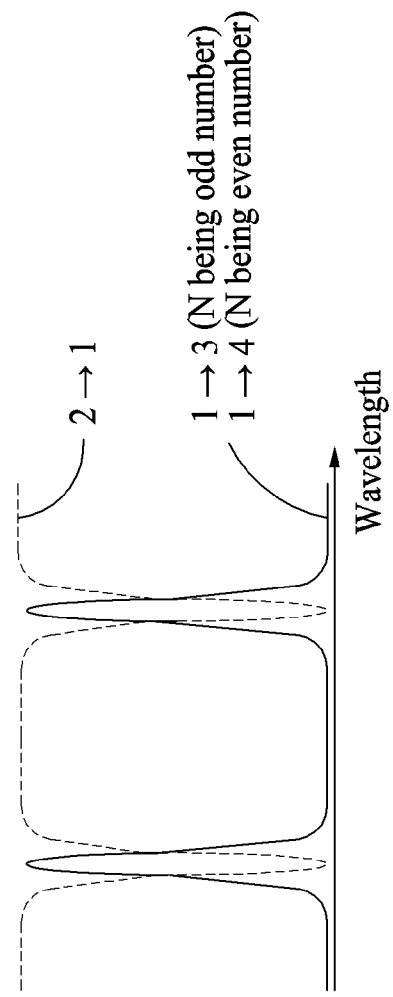

FIGS. 2A and 2B are diagrams illustrating an example of a ring filter configured with a ring resonator and a spectrum of the ring filter according to an example embodiment.

A ring filter configured with N ring resonators may be as illustrated in FIG. 2A. Specifically, the ring filter may include an optical waveguide and the ring resonator. A port 1 may be a port connected to a network of a PON system. In this example, when N is an odd number, that is, when a odd number of ring resonators are provided, an output toward a port 3 may have a characteristic of a band pass filter (BPF) as illustrated in FIG. 2B. In contrast, when N is an even number, that is, when an even number of ring resonators are provided, an output toward a port 4 may have the characteristic of the band pass filter as illustrated in FIG. 2B.

An output from the port 1 toward a port 2 may have a characteristic of a notch filter obtained by removing a wavelength passing the band pass filter represented in the output toward the port 3 or the port 4.

Accordingly, in a case of using the ring filter of FIG. 2A, a downstream signal for a wavelength corresponding to a channel allocated to an ONU among downstream signals may be transmitted via the port 3 or the port 4.

When the port 2 is connected to a transmitter for an upstream signal, the optical signal may be input to the port 1 connected to the network of the PON system. In this example, a wavelength of the optical signal may not be specified. Thus, when an error occurs while the transmitter of the ONU determines a wavelength of the upstream signal, the ONU may become the rogue ONU.

Figure 3:
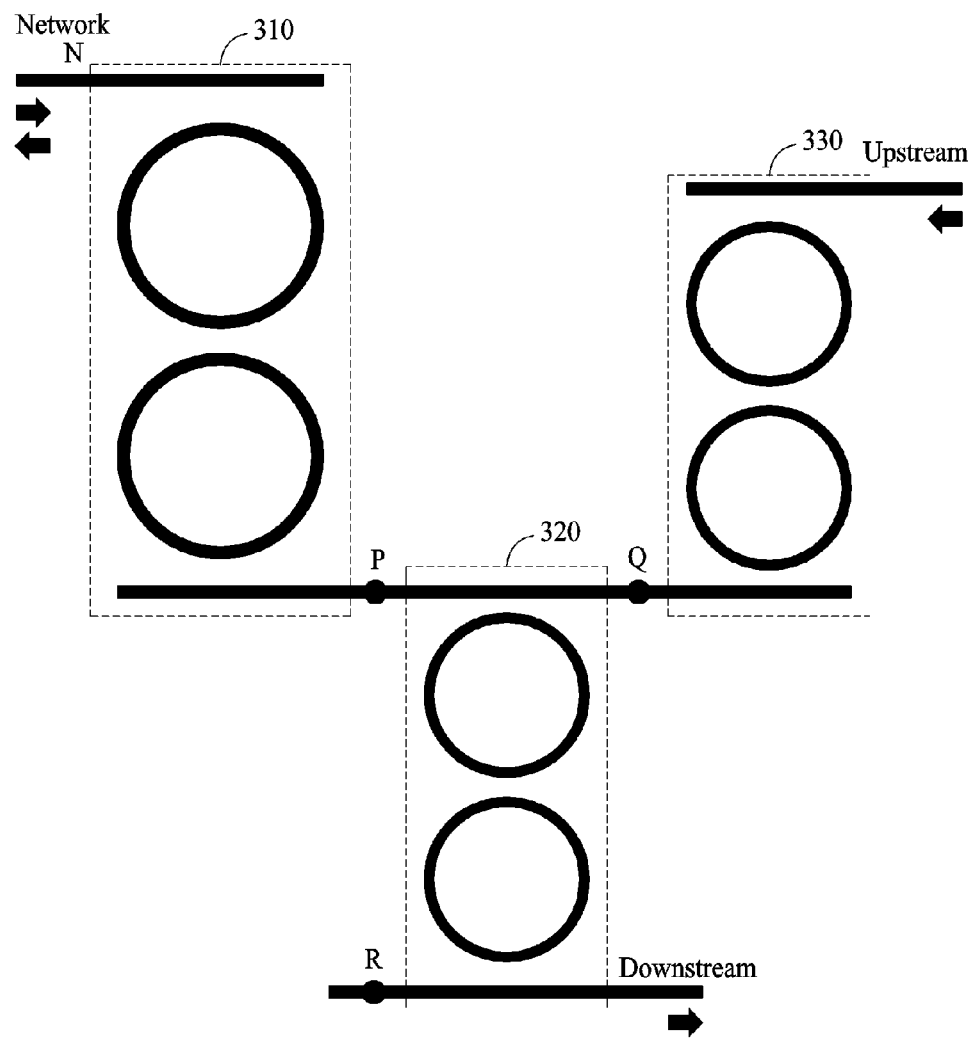
FIG. 3 is a diagram illustrating an example of a first bidirectional optical element configured with a second ring filter according to an example embodiment.

FIG. 3 is a diagram illustrating an example of a first bidirectional optical element configured with a second ring filter according to an example embodiment.

The present disclosure proposes a concept and a structure of a bidirectional optical element in which an upstream signal wavelength is combined with a downstream signal wavelength to avoid a rogue ONU.

FIG. 3 illustrates a structure of a first bidirectional optical element configured with three ring filters using two ring resonators. The first bidirectional optical element may include a main filter 310, a drop filter 320, and an add filter 330.

The main filter 310 may pass an upstream signal having an upstream-channel wavelength and a downstream signal having a downstream-channel wavelength. The drop filter 320 may pass the downstream signal having the downstream-channel wavelength and reject the upstream signal having the upstream-channel wavelength. The add filter 330 may pass the upstream signal having the upstream-channel wavelength and reject the downstream signal having the downstream-channel wavelength.

The main filter 310, the drop filter 320, and the add filter 330 included in the first bidirectional optical element may share a single optical waveguide to transmit or receive the upstream signal and the downstream signal. Also, each of the main filter 310, the drop filter 320, and the add filter 330 may include an even number of ring resonators arranged on a same plane. In this example, the optical waveguide connecting input ports of the main filter 310 and the add filter 330 to an output port of the drop filter 320 may be provided in a straight line shape.

When an optical signal input to a network port corresponding to the input port of the main filter 310 is the downstream signal having the downstream-channel wavelength, the downstream signal may be transferred to the output port of the main filter 310 via the main filter 310. Thereafter, the downstream signal may be output to a downstream port based on a penetration characteristic of the drop filter 320 as a point P.

When an optical signal input to an upstream port corresponding to the input port of the add filter 330 is the upstream signal having the upstream-channel wavelength, the upstream signal may be transferred to the output port of the add filter 330 via the add filter 330. Thereafter, the upstream signal may be output to the network port based on a penetration characteristic of the main filter 310 at a point Q.

In this example, the upstream signal input to the upstream port may reach the point Q by passing a filter when the upstream signal has a wavelength corresponding to a predetermined upstream channel or a wavelength spaced apart from the upstream channel by an FSR of the add filter 330.

The drop filter 320 may reject the upstream signal having the upstream-channel wavelength and thus, a penetration from the point Q to a point R may not occur. Accordingly, the upstream signal having reached the point Q may reach the point P, and then may be output via the network port based on the penetration characteristic of the main filter 310.

Figure 4:
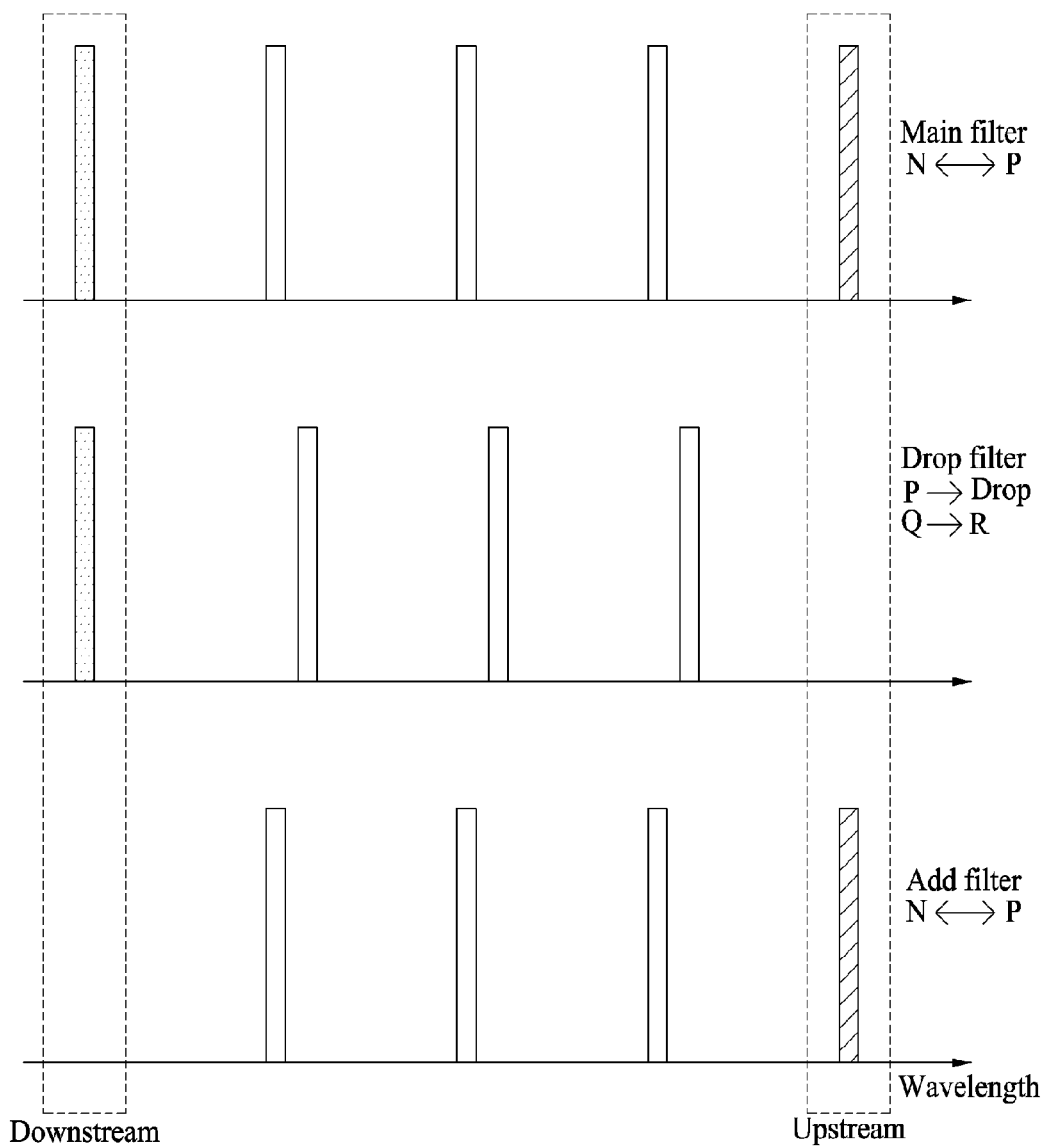
FIG. 4 is a diagram illustrating an example of a spectrum of each ring filter configuring a bidirectional optical element according to an example embodiment.

FIG. 4 is a diagram illustrating an example of a spectrum of each ring filter configuring a bidirectional optical element according to an example embodiment.

Referring to FIG. 4, each ring filter may have a different penetration characteristic. The main filter 310 may be configured to adjust an FSR to pass an upstream signal having an upstream-channel wavelength and a downstream signal having a downstream-channel wavelength between a network port and a point P.

The drop filter 320 may be configured to reject the upstream signal having the upstream-channel wavelength and pass the downstream signal having the downstream-channel wavelength between a downstream port and the point P. For this, the main filter 310 and the drop filter 320 may have different FSRs.

The add filter 330 may be configured to reject the downstream signal having the downstream-channel wavelength and pass the upstream signal having the upstream-channel wavelength between an upstream port and a point Q. For this, the main filter 310 and the add filter 330 may have different FSRs.

Figure 5:
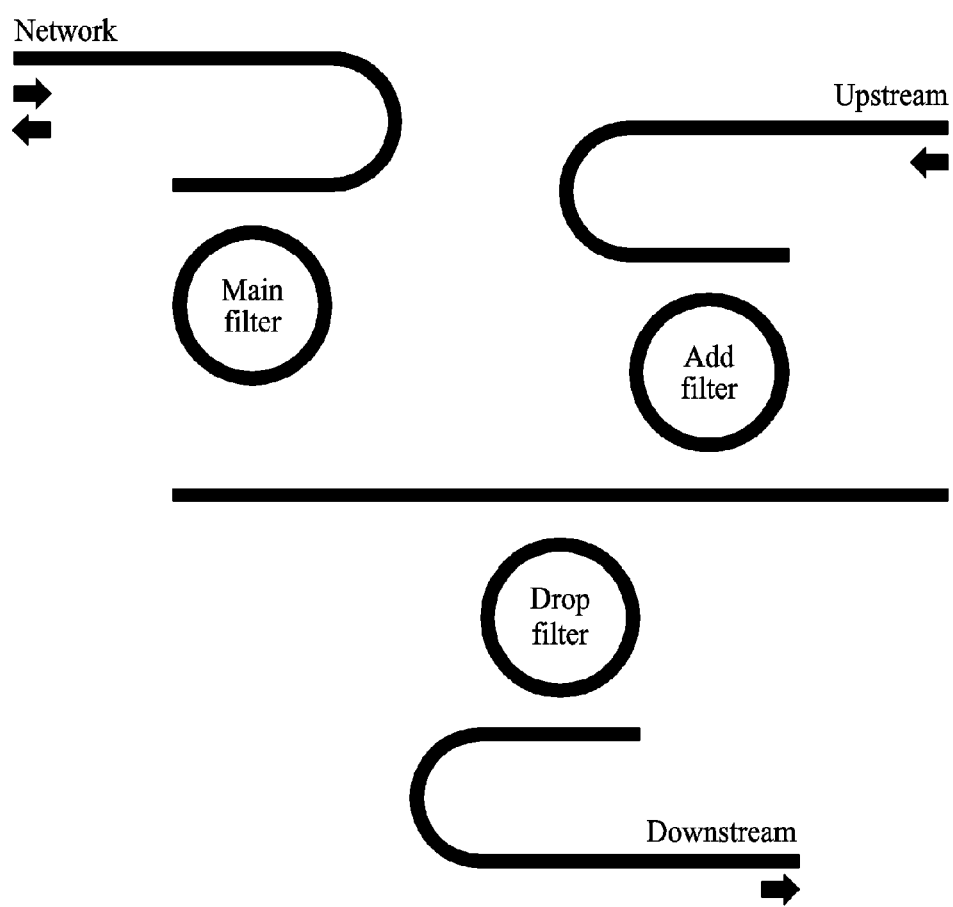
FIG. 5 is a diagram illustrating an example of configuring a bidirectional optical element using a ring filter including a single ring resonator according to an example embodiment.

FIG. 5 is a diagram illustrating an example of configuring a bidirectional optical element using a ring filter including a single ring resonator according to an example embodiment.

In an example of FIG. 5, a second bidirectional optical element may be configured with a ring filter including an odd number of ring resonators in contrast to the example of FIG. 3 illustrating the first bidirectional optical element configured with the ring filter including the even number of ring resonators.

The second bidirectional optical element may include a main filter, a drop filter, and an add filter.

The main filter may pass an upstream signal having an upstream-channel wavelength and a downstream signal having a downstream-channel wavelength. The drop filter may pass the downstream signal having the downstream-channel wavelength and reject the upstream signal having the upstream-channel wavelength. The add filter may pass the upstream signal having the upstream-channel wavelength and reject the downstream signal having the downstream-channel wavelength.

The main filter, the drop filter, and the add filter included in the second bidirectional optical element may share a single optical waveguide to transmit or receive the upstream signal and the downstream signal. Also, each of the main filter, the drop filter, and the add filter may include an odd number of ring resonators arranged on a same plane. In this example, the optical waveguide connecting input ports of the main filter and the add filter to an output port of the drop filter may be provided in a curved line shape. This is because a port receiving the optical signal and a port having a penetration characteristic of a band pass filter are positioned in the same direction when an odd number of ring resonators are provided as illustrated in FIG. 5. Penetration characteristics of the main filter, the drop filter, and the add filter included in the second bidirectional optical element may need to satisfy a condition as described with reference to FIG. 4.

Also, it is possible to apply a method of configuring a bidirectional optical element with ring filters each corresponding to a different degree, for example, the number of ring resonators. In this example, a position of an output port having the penetration characteristic of the band pass filter may vary based on whether the number of ring resonators included in each of the main filter, the drop filter, and the add filter is an odd number or an even number and thus, the ring filters may be connected in various forms.

FIGS. 6A and 6B are diagrams illustrating another example of a first bidirectional optical element configured with a second ring filter according to an example embodiment.

FIGS. 6A and 6B illustrate a structure of a first bidirectional optical element configured with two ring filters using two ring resonators. In FIG. 6A, the first bidirectional optical element may include the main filter 310 and the drop filter 320 excluding the add filter 330 in contrast to the first bidirectional optical element of FIG. 3.

When the add filter 330 is not used, and when the main filter 310 passes a downstream signal having a downstream-channel wavelength, the drop filter 320 may pass the downstream signal because the downstream signal has the same downstream-channel wavelength as the main filter 310 as illustrated in FIG. 6B.

Also, an upstream signal that is input to a point Q via an upstream port of the drop filter 320 may pass the main filter 310 based on a periodical characteristic of the main filter 310. Thus, the upstream signal may be paired with the downstream signal.

Figure 7A:
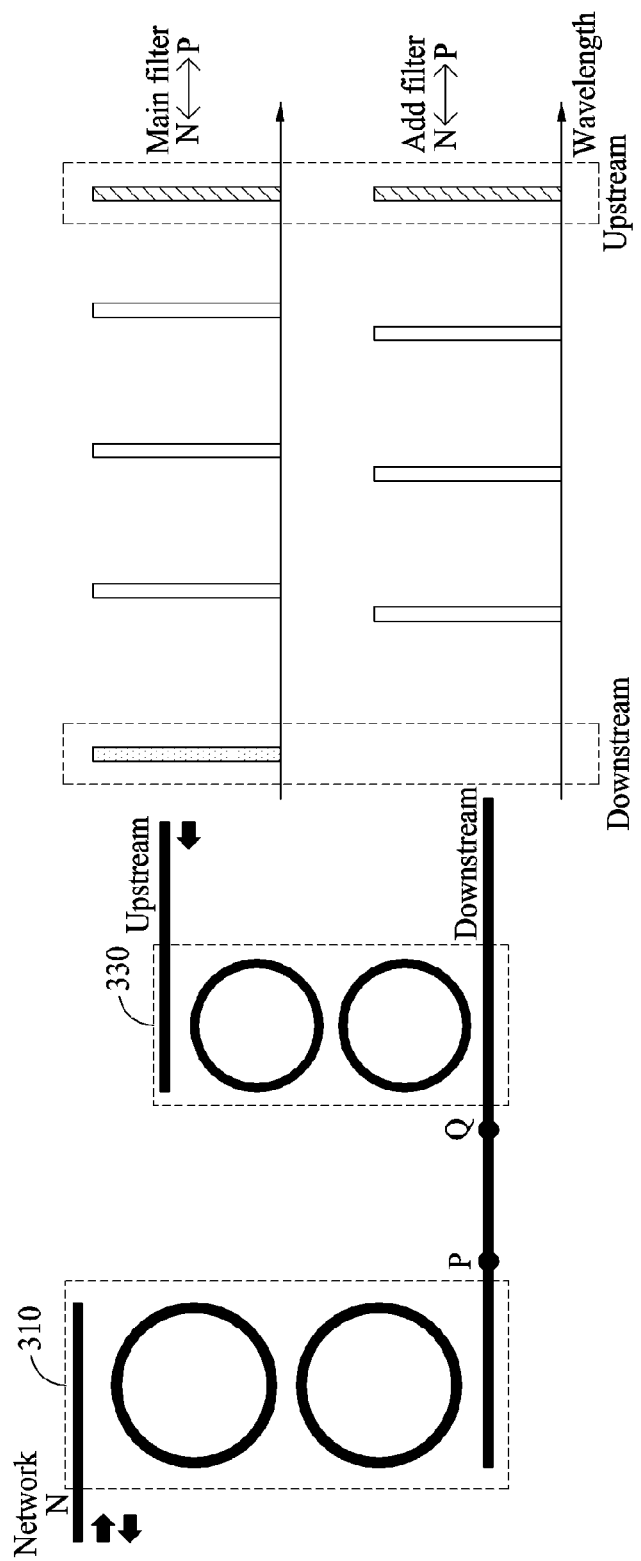
FIGS. 7A and 7B are diagrams illustrating still another example of a first bidirectional optical element configured with a second ring filter according to an example embodiment.
Figure 7B:
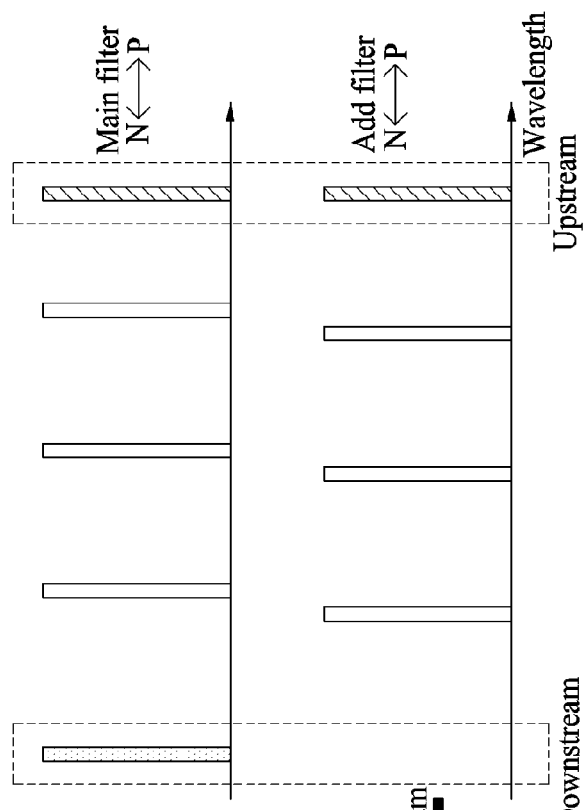

FIGS. 7A and 7B are diagrams illustrating still another example of a first bidirectional optical element configured with a second ring filter according to an example embodiment.

FIGS. 7A and 7B illustrate a structure of a first bidirectional optical element configured with two ring filters using two ring resonators. In FIG. 7A, the first bidirectional optical element may include the main filter 310 and the add filter 330 excluding the drop filter 320 in contrast to the first bidirectional optical element of FIG. 3.

When the drop filter 320 is not used, and when the main filter 310 passes a downstream signal having a downstream-channel wavelength, the downstream signal may be output to a downstream port of the add filter 330 via a waveguide because the add filter 330 rejects the downstream-channel wavelength unlike the main filter 310.

As illustrated in FIG. 7B, having the same upstream-channel waveguide as the main filter 310, an upstream signal that is input to an upstream port of the add filter 330 may pass the add filter 330.

Through this, in the first bidirectional optical element including the main filter 310 and the add filter 330, the upstream signal may be paired with the downstream signal.

According to an aspect, it is possible to provide a bidirectional optical element with a ring filter including a ring resonator, thereby preventing a collision between upstream signals transmitted from a plurality of ONUs.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bidirectional optical element in optical network units (ONUs) of a passive optical network (PON), the bidirectional optical element comprising:
    a main filter configured to pass an upstream signal having an upstream-channel wavelength and a downstream signal having a downstream-channel wavelength;
    a drop filter configured to pass the downstream signal having the downstream-channel wavelength and reject the upstream signal having the upstream-channel wavelength; and
    an add filter configured to pass the upstream signal having the upstream-channel wavelength and reject the downstream signal having the downstream-channel wavelength,
    wherein the main filter, the drop filter, and the add filter are configured to share a single optical waveguide, and the optical waveguide is configured to connect input ports of the main filter and the drop filter and an output port of the drop filter and is provided in a straight line shape.

2. The bidirectional optical element of claim 1, wherein the main filter, the drop filter, and the add filter each include at least one ring resonator arranged on a same plane.

3. The bidirectional optical element of claim 2, wherein the main filter, the drop filter, and the add filter each include an even number of ring resonators.

4. The bidirectional optical element of claim 1, wherein when an optical signal input to the main filter is the downstream signal having the downstream-channel wavelength, the optical signal passes through the main filter and the drop filter.

5. The bidirectional optical element of claim 1, wherein when an optical signal input to the add filter is the upstream signal having the upstream-channel wavelength, the optical signal passes through the add filter and the main filter.

6. The bidirectional optical element of claim 1, wherein the main filter and the drop filter have different free spectral ranges (FSRs) and pass downstream signals having the same downstream-channel wavelength.

7. The bidirectional optical element of claim 1, wherein the main filter and the add filter have different FSRs and pass upstream signals having the same upstream-channel wavelength.

8. A bidirectional optical element in optical network units (ONUs) of a passive optical network (PON), the bidirectional optical element comprising:

a main filter configured to pass an upstream signal having an upstream-channel wavelength and a downstream signal having a downstream-channel wavelength;

a drop filter configured to pass the downstream signal having the downstream-channel wavelength and reject the upstream signal having the upstream-channel wavelength; and an add filter configured to pass the upstream signal having the upstream-channel wavelength and reject the downstream signal having the downstream-channel wavelength, wherein the main filter, the drop filter, and the add filter are configured to share a single optical waveguide, and the optical waveguide is configured to connect input ports of the main filter and the drop filter and an output port of the drop filter and is provided in a curved line shape.

9. The bidirectional optical element of claim 8, wherein the main filter, the drop filter, and the add filter each include at least one ring resonator arranged on a same plane.

10. The bidirectional optical element of claim 9, wherein the main filter, the drop filter, and the add filter each include an odd number of ring resonators.

11. The bidirectional optical element of claim 8, wherein when an optical signal input to the main filter is the downstream signal having the downstream-channel wavelength, the optical signal passes through the main filter and the drop filter.

12. The bidirectional optical element of claim 8, wherein when an optical signal input to the add filter is the upstream signal having the upstream-channel wavelength, the optical signal passes through the add filter and the main filter.

13. The bidirectional optical element of claim 8, wherein the main filter and the drop filter have different free spectral ranges (FSRs) and pass downstream signals having the same downstream-channel wavelength.

14. The bidirectional optical element of claim 8, wherein the main filter and the add filter have different FSRs and pass upstream signals having the same upstream-channel wavelength.

* * * * *